(12) United States Patent
Kijima

(10) Patent No.: US 6,476,866 B1
(45) Date of Patent: Nov. 5, 2002

(54) IMAGING APPARATUS WITH ELECTRICAL EXPOSURE TIME CONTROL

(75) Inventor: Takayuki Kijima, Akiruno (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/386,752

(22) Filed: Aug. 31, 1999

(30) Foreign Application Priority Data

Sep. 1, 1998 (JP) .......................................... 10-246821

(51) Int. Cl.⁷ ........................... H04N 3/14; H04N 5/235
(52) U.S. Cl. ........................................ 348/296; 348/362
(58) Field of Search ............................... 348/296, 297, 348/298, 299, 362, 364, 349

(56) References Cited

U.S. PATENT DOCUMENTS

| | | | | |
|---|---|---|---|---|
| 5,463,421 A | * | 10/1995 | Deguchi et al. ............ | 348/296 |
| 5,517,243 A | * | 5/1996 | Kudo et al. .................. | 348/296 |
| 5,793,422 A | * | 8/1998 | Mochizuki et al. ......... | 348/296 |

\* cited by examiner

*Primary Examiner*—Wendy R. Garber
*Assistant Examiner*—Rashawn N. Tillery
(74) *Attorney, Agent, or Firm*—Straub & Pokotylo; John C. Pokotylo

(57) ABSTRACT

An imaging apparatus with electrical exposure time control function capable of high accuracy control of the electronic shutter and ensuring high exposure accuracy is disclosed. An imaging element accumulates signal charge corresponding to an incident scene light flux in a photo-electric converting element section. The accumulated signal charge is read out as a pixel signal. Charge accumulation control means controls the instant of ending of charge accumulation in the imaging element to an instant other than the horizontal blanking period and/or controls the instant of ending of charge accumulation in the imaging element in time units shorter than the horizontal sync signal interval.

16 Claims, 9 Drawing Sheets

FIG.6

| SPEED SET DATA | | | | | | | | | | | | OPERATION MODE |
|---|---|---|---|---|---|---|---|---|---|---|---|---|
| SD11 | SD10 | SD9 | SD8 | SD7 | SD6 | SD5 | SD4 | SD3 | SD2 | SD1 | SD0 | |
| 1 | 0 | 0 | 0 | 0 | x | x | x | x | D2 | D1 | D0 | SET MECHANICAL SHUTTER DRIVE TIME |
| 1 | 0 | 0 | 1 | 0 | x | x | D4 | D3 | D2 | D1 | D0 | SET SHUTTER V (LOWER) |
| 1 | 0 | 1 | 1 | 1 | D11 | D10 | D9 | D8 | D7 | D6 | D5 | SET SHUTTER V (UPPER) |
| 1 | 0 | 1 | 0 | 0 | x | x | x | x | D2 | D1 | D0 | FINE ADJUST SET SHUTTER TGP |
| 1 | 1 | 0 | 0 | D7 | D6 | D5 | D4 | D3 | D2 | D1 | D0 | SET SHUTTER SUB (LOWER IN H UNIT) |
| 1 | 1 | 1 | 0 | 0 | x | x | x | x | x | D10 | D9 | SET SHUTTER SUB (UPPER IN H UNIT) |

FIG.7

(UNIT:HORIZONTAL CLOCK)

| DATA DTGP | | | FROM FALLING OF HD | |
|---|---|---|---|---|
| | | | TGP | |
| D2 | D1 | D0 | ↴ | ↥ |
| 0 | 0 | 0 | 130 | 170 |
| 0 | 0 | 1 | 398 | 438 |
| 0 | 1 | 0 | 666 | 706 |
| 0 | 1 | 1 | 934 | 974 |
| 1 | 0 | 0 | 1202 | 1242 |
| 1 | 0 | 1 | 1470 | 1510 |
| 1 | 1 | 0 | 1738 | 1778 |
| 1 | 1 | 1 | 2006 | 2046 |

IMAGING APPARATUS WITH ELECTRICAL EXPOSURE TIME CONTROL

BACKGROUND OF THE INVENTION

The present invention relates to imaging apparatuses having an imaging element capable of reading out pixel signal of, for instance, an electronic still camera or a video camera and, more particularly, to imaging apparatuses having a so-called electronic shutter function of electrically controlling the exposure time.

As such an imaging apparatus, Japanese Patent Laid-Open No. 64-46379 discloses one, in which after the end of charge accumulation in the imaging element a read pulse for reading out the accumulated signal charge is generated at a predetermined timing, and in correspondence to this read pulse a sweep-out pulse for sweeping out the charge accumulated in the imaging element to the substrate and starting exposure, i.e., charge accumulation, afresh is generated at an instant in the vertical blanking period in a high shutter speed range and in a given horizontal blanking period in a low shutter speed range which is deviated from the vertical blanking period.

In this prior art imaging apparatus, in the high shutter speed range the timing of the sweep-out pulse generation is made variable within the vertical blanking period, thus permitting continuous shutter speed control. It is thus possible to control the exposure time such that the signal charge reaches an appropriate charge accumulation level at the instant of the read pulse generation and thus ensure high exposure accuracy.

However, in the low shutter speed range in which the sweep-out pulse generation timing is deviated from the vertical blanking period, the sweep-out pulse is generated fixedly in a given horizontal blanking period. Therefore, the shutter speed can be controlled only in time units of one horizontal sync signal, i.e., one horizontal line (1 H). For this reason, an error of 1 H at the most is generated in the actual exposure time, thus reducing the exposure accuracy. It is conceivable to make up for the excess and deficiency of signal charge from the appropriate charge accumulation level due to the exposure time error by controlling the gain of a following stage amplifier. In the amplifier gain control, however, the linearity is generally inferior. Therefore, this gain control does not permit accurate excess and deficiency correction. Besides, the S/N (signal-to-noise) ratio is varied with the gain.

SUMMARY OF THE INVENTION

The present invention was made in view of the above problems, and it has an object of providing an imaging apparatus capable of high accuracy control of the electronic shutter and ensuring high exposure accuracy.

According to an aspect of the present invention, there is provided an imaging apparatus having an imaging element for accumulating signal charge corresponding to an incident scene light flux in a photo-electric converting element section and capable of reading out the accumulated signal charge as a pixel signal comprising charge accumulation control means for controlling the instant of ending of charge accumulation in the imaging element to an instant other than the horizontal blanking period.

According to another aspect of the present invention, there is provided an imaging apparatus having an imaging element for accumulating signal charge corresponding to an incident scene light flux in a photo-electric converting element section and capable of reading out the accumulated signal charge as a pixel signal comprising charge accumulation control means for controlling the instant of ending of charge accumulation in the imaging element in time units shorter than the horizontal sync signal interval.

The following more specific structures are also provided:

The imaging element includes a charge accumulation area and a transfer shift register; and the charge accumulation control means ends charge accumulation in the imaging element by transferring signal charge accumulated in the charge accumulation area to the transfer shift register.

The imaging element includes a charge accumulation area; and the charge accumulation control means starts charge accumulation in the imaging element by sweeping out signal charge accumulated in the charge accumulation area to the substrate of the imaging element.

The imaging element is CCD.

The charge accumulation control means determines obtains an appropriate exposure time on the basis of the light measurement data of the subject scene image and determines the instant of ending of charge accumulation in the imaging element.

The exposure time control by the charge accumulation control of the charge accumulation control means is performed in 1 H unit.

The exposure time control by the charge accumulation control of the charge accumulation control means is performed in 1 V unit.

The imaging apparatus further comprising mechanical shutter for controlling the exposure time.

Other objects and features will be clarified from the following description with reference to attached drawings.

BRIEF DESCRIPTION OF THE DRAWINGS

FIG. 6 is a view showing the relation between data transmitted from CPU to TG and corresponding various operation modes of TG;

FIG. 7 is a view showing the relation between setting data contents in a shutter TGP fine adjustment mode transmitted from CPU to TG in FIG. 3 and corresponding horizontal clock pulse numbers at the instants of falling and rising of a transfer gate pulse from the instant of falling of horizontal sync signal;

PREFERRED EMBODIMENTS OF THE INVENTION

Figure 1:
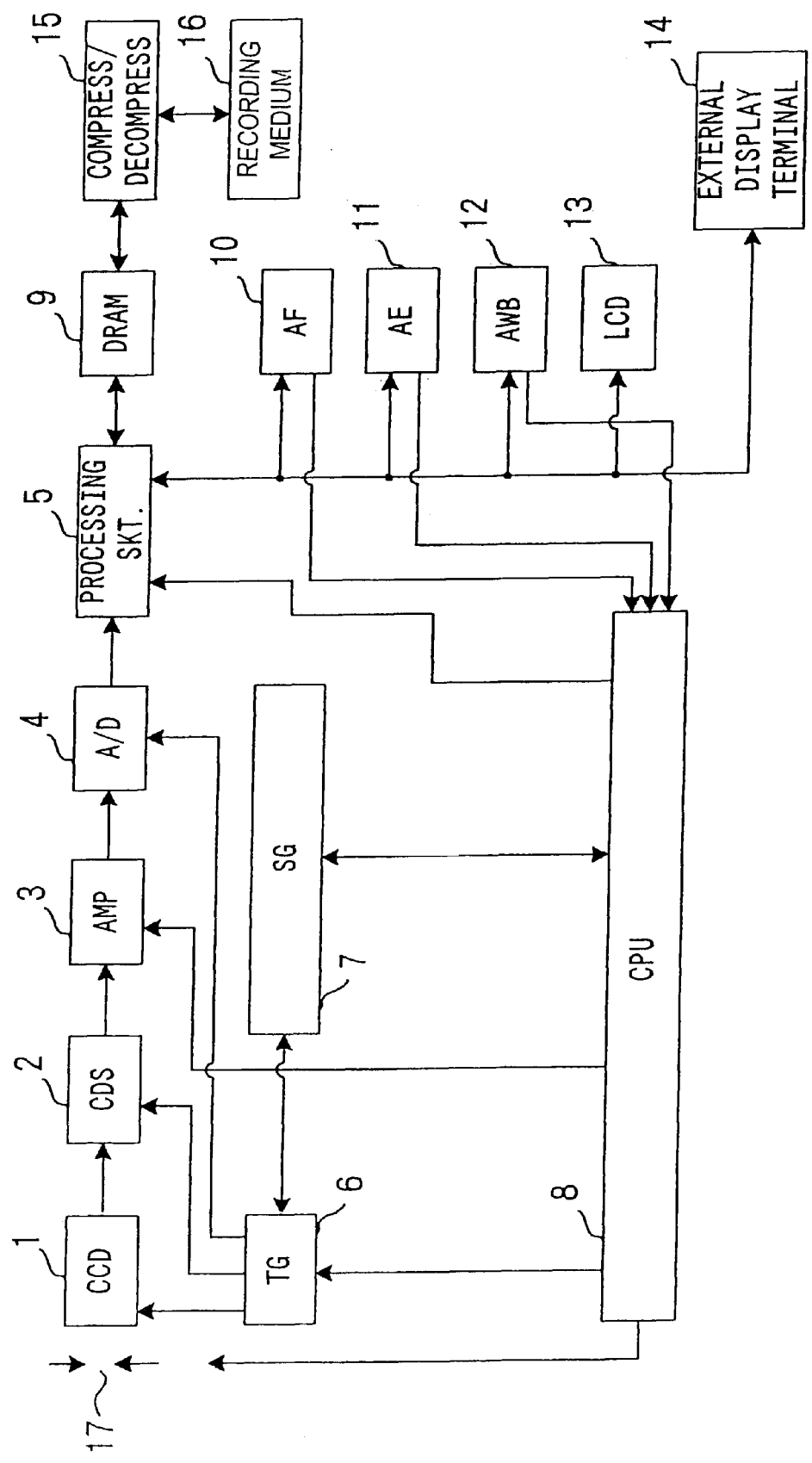
FIG. 1 is a block diagram showing the construction of one embodiment of the imaging apparatus according to the present invention.

FIG. 1 is a block diagram showing the construction of one embodiment of the imaging apparatus according to the present invention. This imaging apparatus basically has a main purpose of imaging and recording still pictures or images. The imaging apparatus comprises a CCD 1, a correlation double sampling circuit (CDS) 2, a gain control amplifier (AMP) 3, an analog-to-digital converter (A/D) 4, a processing circuit 5, a timing generator (TG) 6, a signal generator (SG) 7, a CPU 8, a DPAM 9, an auto-focusing (AF) circuit 10, an auto-exposure control (AE) circuit 11, an auto-white-balancing (AWB) circuit 12, a liquid crystal display 13, an external display terminal 14, a compressing/decompressing circuit 15 and a recording medium 16. The CCD 1 converts a subject scene image incident through a lens system and a stop to an electric signal. The CDS 2 removes reset noise or the like from the output of the CCD 1. The AMP 3 controls the gain of the output of the CDS 2. The A/D 4 converts the output signal of the AMP 3 to a digital signal. The processing circuit 5 subjects this converted digital image signal to various processes. The TG 6 outputs various drive pulses for driving the CCD 1, pulses for sampling and holding in the CDS 2 and timing pulses for A/D conversion in the A/D 4. The SG 7 generates a signal for synchronizing operations of the TG 6 and the CPU 8 noted above. The CPU 8 is constituted by, for instance, a microcomputer constituting read control means for the CCD 1 and also executes timing and various other controls of the entire imaging apparatus. The DRAM 9 constituting a memory for storing pixel data of the CCD 1 outputted from the processing circuit 5 and image data supplied from a recording medium 16 to be described later through a compressing/decompressing circuit 15. The AF circuit 10 controls the auto-focusing by the lens system and a stop 17. The AE circuit 11 performs light measurement of the subject scene image focused on the CCD 1. The AWB 12 automatically controls the white balance. The liquid crystal display 13 is provided as a built-in monitor in the imaging apparatus. The external display terminal 14 is provided for outputting an image signal or the like to an external monitor or the like. The compressing/decompressing circuit 15 compresses one frame image data stored in the DRAM 9 for recording the data by reducing the quantity thereof on the recording medium 16, and decompresses the compressed image data read out from the recording medium 16. Still image data are recorded on the recording medium 16.

Figure 2:
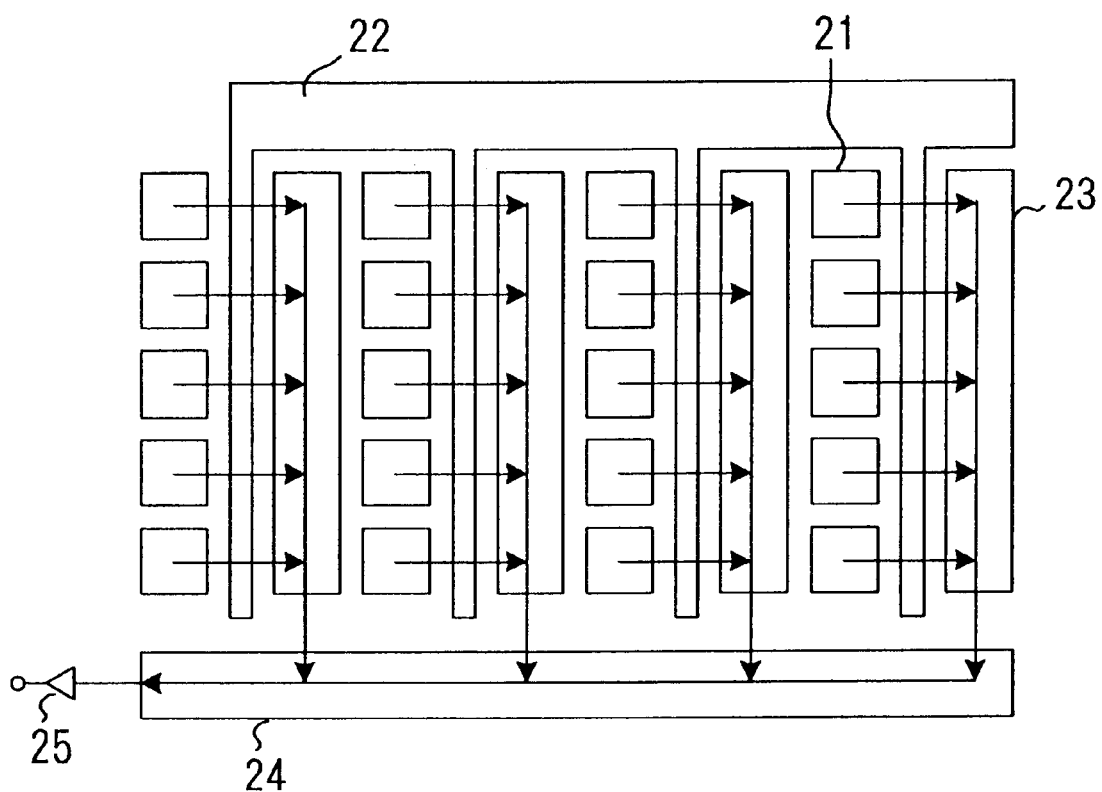
FIG. 2 schematically shows the constitution of an example of the CCD 1 shown in FIG. 1.

FIG. 2 schematically shows the constitution of an example of the CCD 1 shown in FIG. 1. The CCD 1 is of an inter-line type having a vertical over-flow drain structure, and it includes a plurality of photo-diodes 21, a plurality of vertical shift registers 23, a horizontal shift register 24 and a signal detector 25. The photo-diodes 21 are arranged two-dimensionally in the horizontal and vertical directions, and constitute a charge accumulation area for accumulating charge in response to light incidence. The vertical shift registers 23 receive the charge stored in the respective pertinent photo-diodes 21 via the respective transfer gates 22 and successively transfer the received charge in the vertical direction. The horizontal shift register 24 successively transfers the charge transferred for the vertical shift registers 23 in the horizontal direction. The signal detector 25 amplifies the output signal of the horizontal shift register 24, and outputs the amplified signal.

The imaging apparatus shown in FIG. 1 operates as a whole as follows. For recording the image on the recording medium 16, the image data which has been supplied from the CCD 1 through the CDS 2, the AMP 3, the A/D 4 and the processing circuit 5, is supplied to, for instance, the liquid crystal display 13 for its display. The photographer thus can determine the arrangement or the like of the subject scene while watching the liquid crystal display 13. By depressing a shutter release button (not shown) in this state, the image data is coupled from the processing circuit 5 through the DRAM 9 to the compressing/decompressing circuit 15 for compression and then recorded on the recording medium 16.

For reproducing the image data recorded in the recording medium 16, the compressed image data read out from the recording medium 16 is decompressed in the compressing/decompressing circuit 15 and then written in the DRAM 9. The image data written in the DRAM 9 is supplied through the processing circuit 5, and thence supplied to the liquid crystal display 13 or through the external display terminal 14 to an external display for reproducing it as still picture.

Figure 3:
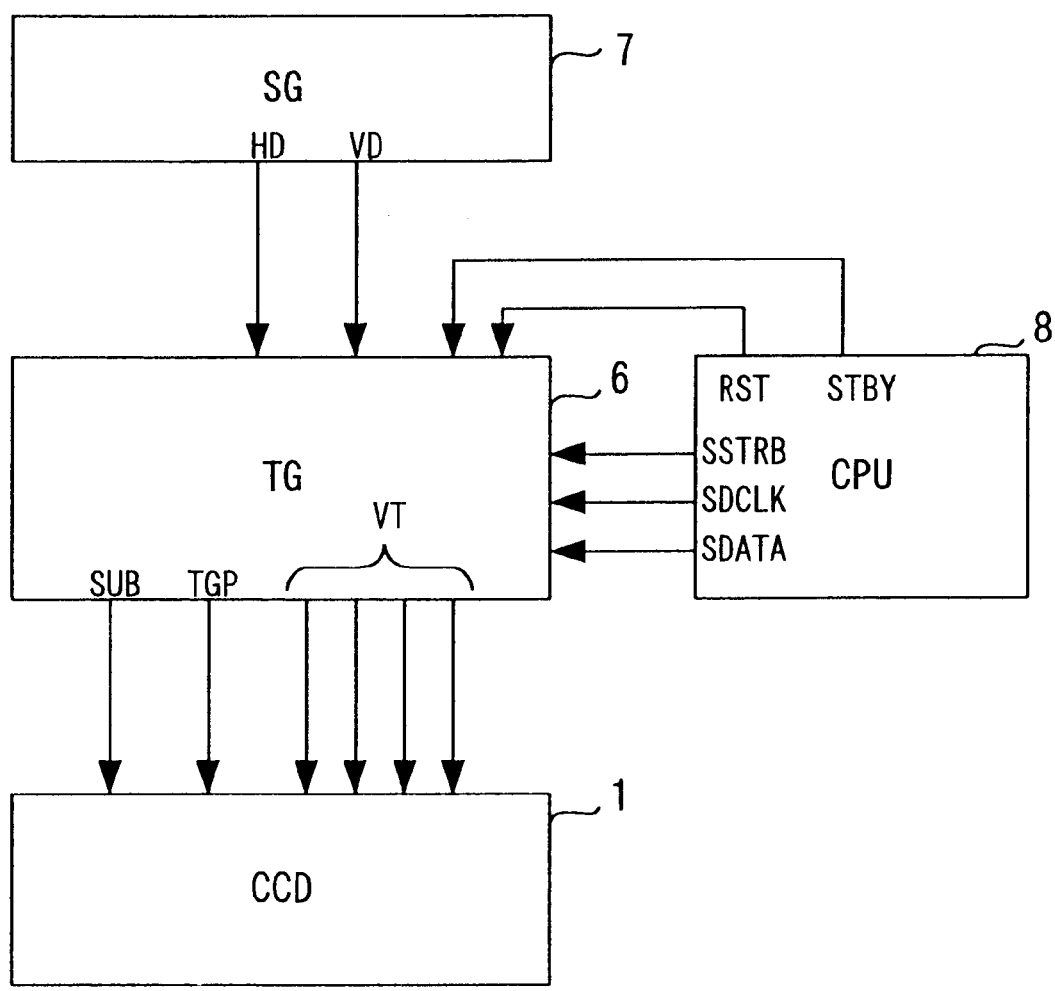
FIG. 3 is a detailed block diagram showing a portion in FIG. 1, and shows signals supplied from the SG 7 and the CPU 8 to the TG 6 and also signals supplied therefrom to the CCD 1.
Figure 4:
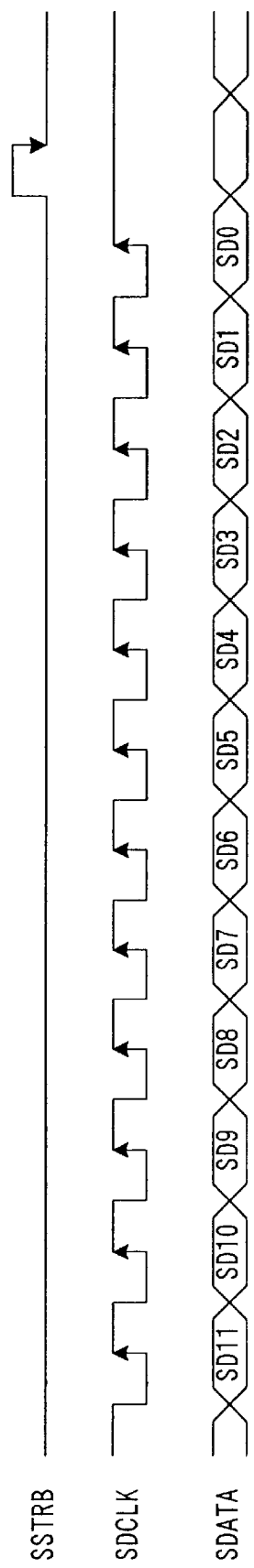
FIG. 4 is a drawing showing an exemplified data communication format between CPU and TG.

FIG. 3 is a detailed block diagram showing a portion in FIG. 1, and shows signals supplied from the SG 7 and the CPU 8 to the TG 6 and also signals supplied therefrom to the CCD 1. The CPU 8 sets various operation modes of the TG 6 by executing data communication therewith in a data communication format shown in FIG. 4 with signals sent on three communication lines SSTRB, SDCLK and SDATA. The CPU 8 also initializes the TG 6 and controls the same to an inoperative state by supplying a reset signal RST and a stand-by signal STBY to the TG 6.

The SG 7 supplies a vertical and a horizontal sync signals VD and HD to the TG 6. The TG 6 controls charge accumulation and charge read-out from the CCD 1 by supplying sub-pulses SUB, transfer gate pulses TGP and vertical shift register transfer pulses VT to the CCD 1 according to the vertical and horizontal sync signals VD and HD from the SG 7 and also various operation modes set up by the CPU 8.

The sub-pulses SUB serve to cause discharge of the charge accumulated in the photo-diodes 21 in the CCD 1 shown in FIG. 2 in the vertical direction of the substrate. Charge discharge is in force during the sub-pulses SUB generation. The transfer gate pulses TGB serve to determine the transfer timings of the charge accumulated in the photo-diodes 21 to the vertical shift registers 23. The vertical shift register transfer pulses VT serve to drive the vertical shift registers 23 to transfer the charge to the horizontal shift register 24.

With the above arrangement, an electronic shutter (element) is realized, in which the charge is accumulated in a time section from the instant of generation of a sub-pulse SUB till the instant of generation of a transfer gate pulse TGP, and effective exposure time is controlled through control of the charge accumulation time.

Figure 5:
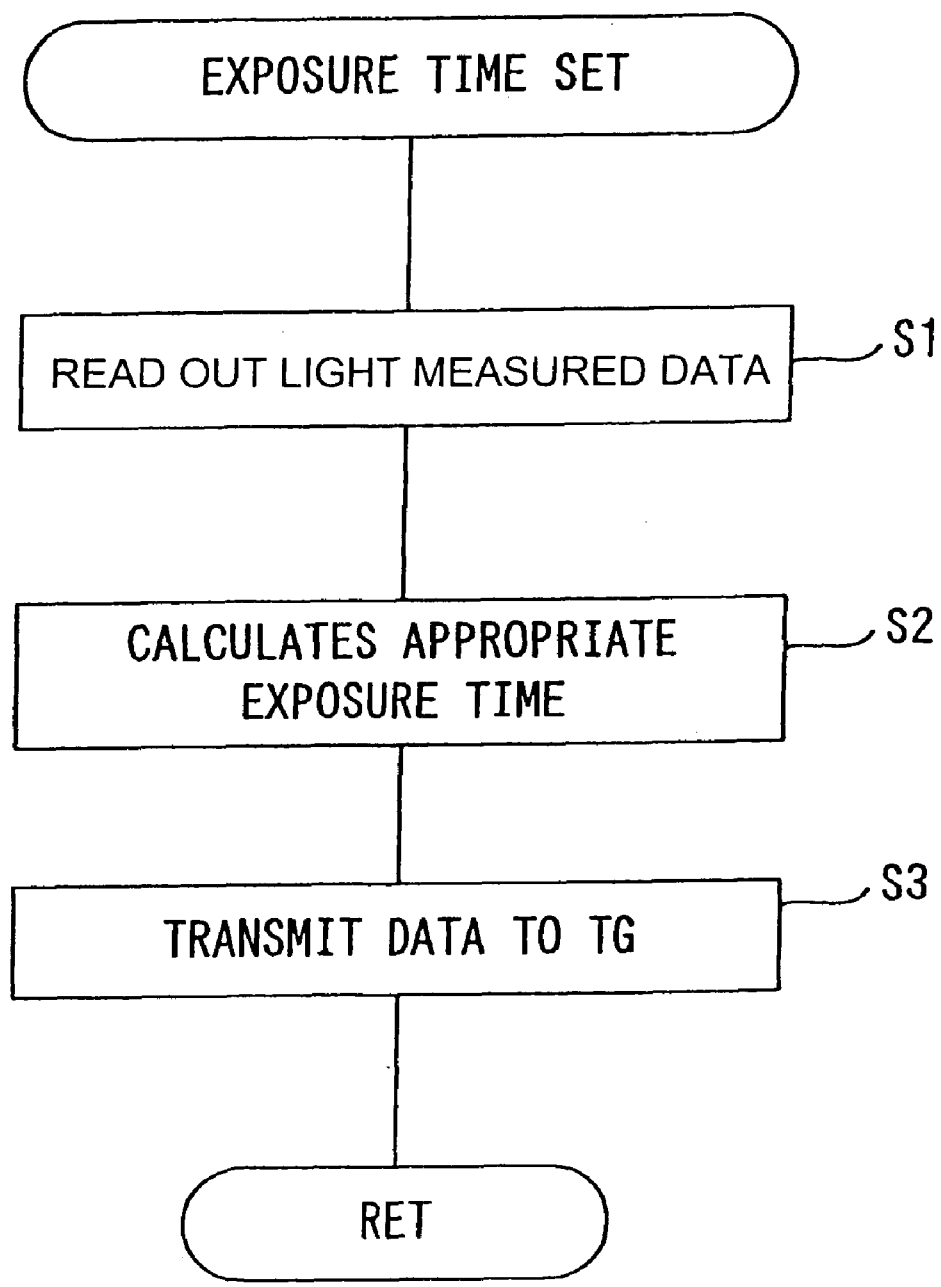
FIG. 5 is a flow chart showing the exposure time setting operation in the embodiment of FIG. 1.

As for the charge accumulation time (i.e., exposure time), as shown in the flow chart of FIG. 5, the CPU 8 reads out light measurement data obtained in the AE circuit 11 by performing light measurement of the subject scene image (step S1), calculates an appropriate exposure time on the basis of the light measurement data (step S2), transmits data to the TG 6 in correspondence to the calculated appropriate exposure time to set various operation modes and thus control the generation timings of the sub-pulses SUB and the transfer gate pulses TGP (step S3).

FIG. 6 shows the relation between data transmitted from the CPU 8 through the communication line SDATA to the TG 6, i.e., 12 bits (SD11 to SD0) and various operation modes of the TG 6 corresponding to the transmitted data.

Referring to FIG. 6, in a shutter TGP fine adjustment mode, a very short time exposure time tTGP (tTGP being the number of horizontal clock pulses) from the instant of falling of a horizontal sync signal HD till the instant of generation of a transfer gate pulse TGP. In this embodiment, data DTGB, i.e. lower 3 bits (D2 to D0) of the set data, is set for lower 3 bits (SD2 to SD0) of the transmitted data is transmitted. Using the data DTGP, tTGP is set as:

$$tTGP=268 \times DTGP+\alpha \quad (1)$$

Here α is a clock pulse number slightly greater than the horizontal clock pulse number in the horizontal blanking period, and in this embodiment it is set to, for instance, 130.

Figure 8:
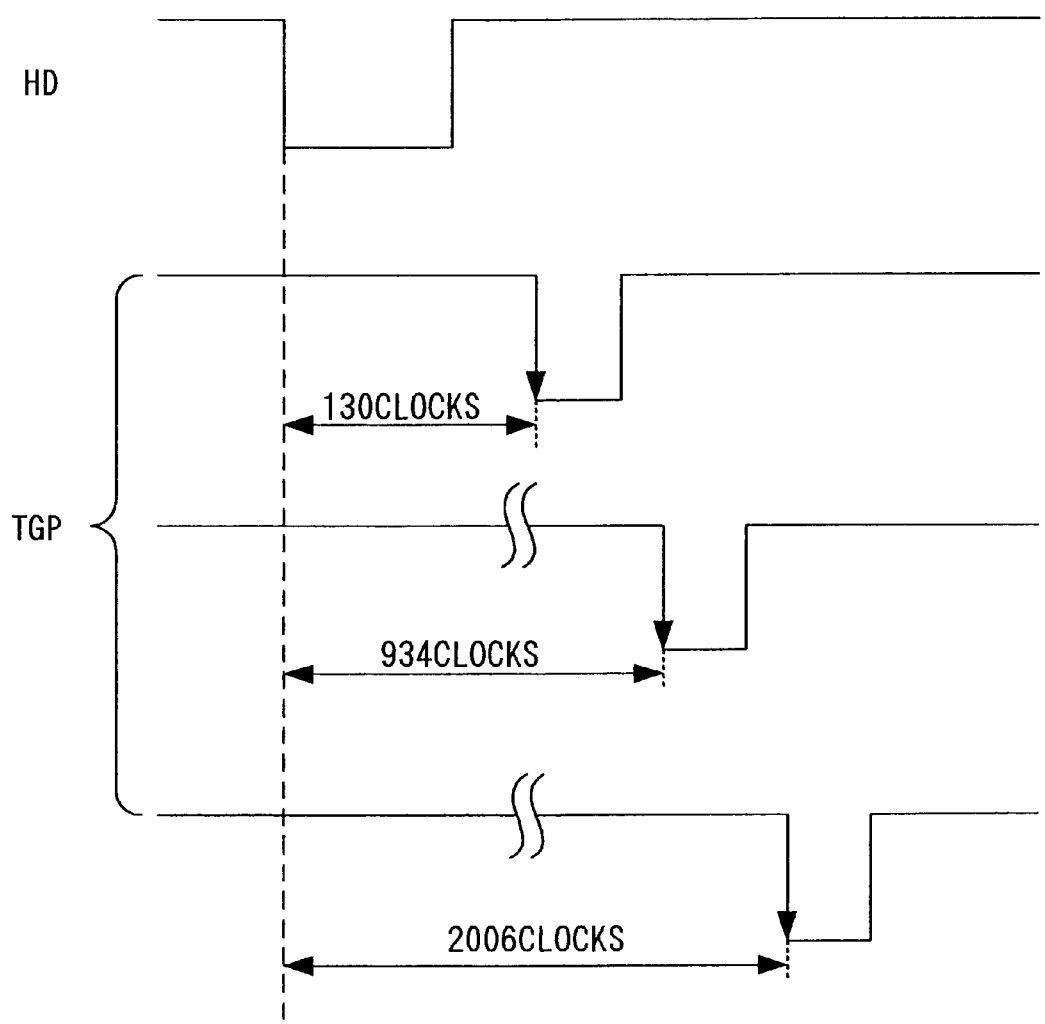
FIG. 8 is a timing chart showing the relation of transfer gate pulses set in the shutter TGP fine adjustment mode and horizontal sync signal to one other.

Thus, as shown in FIGS. 7 and 8, a very short exposure time tTGP corresponding to the data content of the data DTGP is selectively set among eight very short exposure times with 268 horizontal clock pulses as a unit from the falling of the horizontal sync signal HD. FIG. 7 shows the relation between the data contents of the data DTGP and the numbers of horizontal clock pulses at the instants falling and rising of a transfer gate pulse since the instant of falling of a horizontal sync signal HD. FIG. 8 is a timing chart showing various transfer gate pulses TGP and the horizontal sync signal HD. In this case, the pulse width of the low level section of the transfer gate pulses TGP is set to 40 horizontal clock pulses, and the number of horizontal clocks in 1 H is set to 2,145.

Thus, in this shutter TGP fine adjustment mode, each transfer gate pulse TGP can be generated at an instant other than the horizontal blanking period and in time units of 268 horizontal clock pulses shorter than 1 H.

Referring to FIG. 6 again, in a shutter SUB setting mode, the timing of the start of charge accumulation is controlled by making the timing of generation of each sub-pulse SUB to be variable in units of 1 H. In this embodiment, of shutter SUB setting data data DSUBH of upper 2 bits (D10 and D9) and data DSUBL of lower 9 bits (D8 to D0) are transmitted as separate transmitted data. More specifically, the data SSUBH of the upper 2 bits (D10 and D9) and the data DSUBL of the lower 9 bits (D8 to D0) are transmitted by assigning the former data to the lower 2 bits (SD1 ands SD0) of one transmitted data and the latter data to the lower 9 bits (SD8 and SD0) of other transmitted data. Thus, by using the data DSUBH and DSUBL the exposure time tSUB (tSUB being number of horizontal clock pulses) is set as $$tSUB=DSUBH \times 2^9 + DSUBL \quad (2)$$

In this shutter SUB setting mode, the exposure time tSUB thus can be set in units of 1 H in a range of 0 to 2,047 H.

In a shutter V setting mode, the exposure time is controlled in units of one frame (V). In this embodiment, of shutter V setting data data DVH of upper 7 bits (D11 to D5) and data DVL of lower 5 bits (D4 to D0) are transmitted as separate transmitted data. More specifically, the data DVH of the upper 7 bits (D11 to D5) and the data DVL of the lower 5 bits (D4 to D0) are transmitted by assigning the former data to the lower 7 bits (SD6 to SD0) of one transmitted data and the latter data to the lower 5 bits (SD4 to SD0) of other transmitted data. In this way, by using the data DVH and DVL the exposure time tv (tv being number of frames) is set as:

$$tv=DVH \times 2^5 + DVL \quad (3)$$

In this shutter V setting mode, the exposure time for long time exposure thus can be set in units of 1 V in a range of 0 to 4,095 V.

As shown above, with various operation modes of the TG 6 set by the CPU 8 according to the appropriate exposure time, denoting the number of horizontal sync pulses, i.e., number of lines, in 1 V by L and the number of horizontal clock pulses in 1 H by n, the exposure time tR (tR being horizontal clock pulses) from the instant of generation of a sub-pulse SUB till the instant of generation of a transfer gate pulse TGP, is expressed as:

$$tR=Lntv+n \, tSUB+tTGP \quad (4)$$

Thus, when one horizontal clock time is m sec., the shutter speed Tsp is $$Tsp=1/(mtR) \quad (5)$$

In accordance with 37 C.F.R. §1.121(b)(1)(iii), separate sheets with the replacement paragraphs, marked up to show all changes relative to the previous version of the paragraphs, is filed herewith.

While FIG. 6 also shows a mechanical shutter drive time setting mode for controlling the exposure time in cooperation with the electronic shutter and transmitted data for setting this mode, this mode and data are not described.

Figure 9:
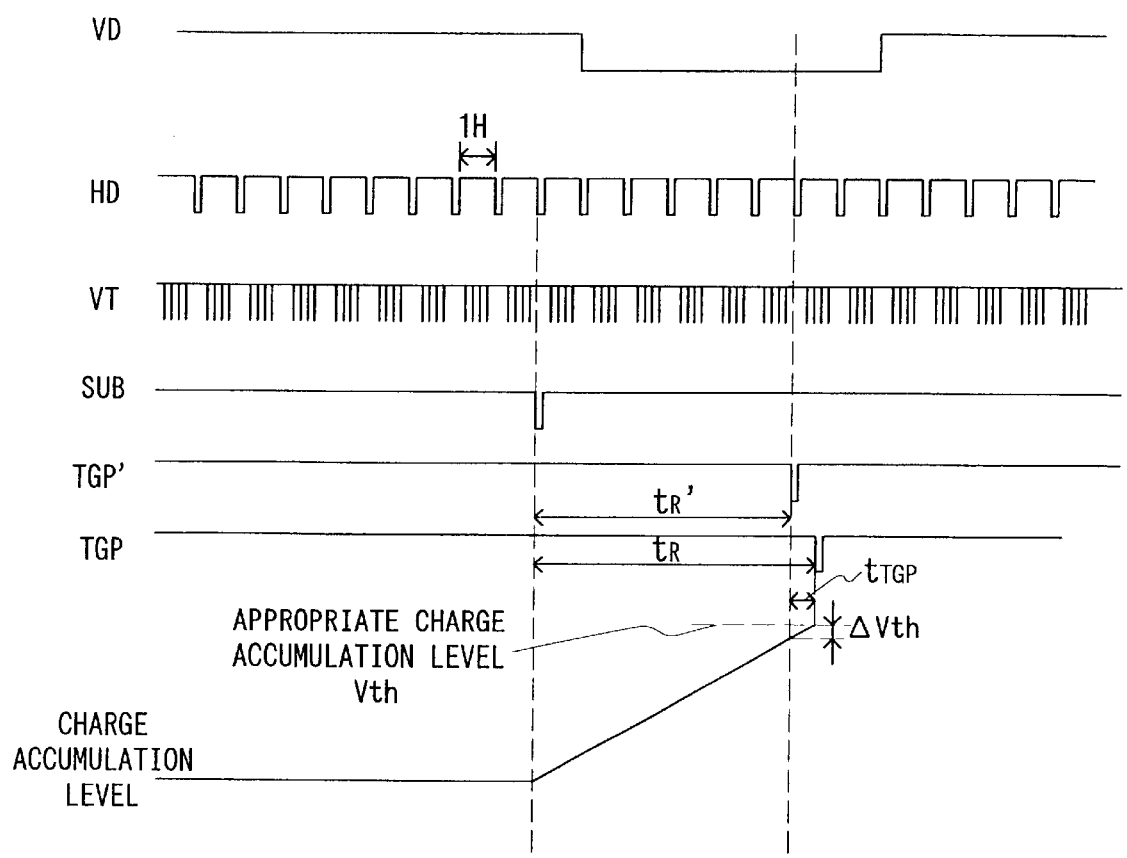
FIG. 9 is a timing chart comparing the CCD operation in the embodiment shown in FIG. 1 and the prior art example CCD operation.

FIG. 9 is a timing chart comparing the operation of the CCD 1 in this embodiment and the operation in a prior art example. In this embodiment, the generation timing of each sub-pulse SUB is synchronized to the horizontal blanking time, and the generation timing of each transfer gate pulse TGP is set such that the time tTGP (i.e., horizontal clock pulse number) from the instant of falling of the horizontal sync signal HD, i.e., the start of the horizontal blanking period, is variable within 1 H period. It is thus possible to accurately control the exposure time tR (i.e., horizontal clock pulse number) to a time such that the charge accumulation level corresponds to appropriate charge accumulation level Vth. The exposure time tR shown in FIG. 9 is in the case of setting DTGP in the equation (1) to a desired value, setting DSUBH=0 and DSUBL=6 in the equation (2) and DVH=0 and DVL=0 in the equation (3).

In the prior art control of the exposure time tR' (i.e., horizontal clock pulse number) by synchronizing both of the sub-pulses SUB and the transfer gate pulses TGP' with the horizontal blanking period, an error of Δ Vth of the appropriate charge accumulation level Vth is generated to reduce the accuracy of exposure.

As has been described in the foregoing, in this embodiment the shutter speed can be finely controlled in 1 H which is deviated from the horizontal blanking period, and it is thus possible to greatly improve the exposure accuracy not only in the high shutter speed range but also in the low shutter speed range.

The above embodiment is by no means limitative, and various changes and modifications may be made without departing from the scope of the present invention. For example, while in the above embodiment the minimum resolution of the transfer gate pulses TGP was set to 268 horizontal clock pulses, it is also possible to improve the resolution by increasing the number of set data bits or permit analog-wise continuous control.

According to the present invention the instant of ending of the charge accumulation in the imaging element is controlled to an instant other than the horizontal blanking period. Thus, it is particularly possible to obtain high accuracy control of the electronic shutter and ensure high exposure accuracy by controlling the instant of ending in time units shorter than the horizontal sync signal interval.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A method for controlling an exposure time by controlling a charge accumulation time of a photodiode of an imaging element in synchronism with a transfer gate pulse signal, the method comprising:
   a) obtaining a reference horizontal clock number by
      i) determining a product of a unit clock number and a determined integral number, wherein the unit clock number is the number of reference horizontal clocks in one horizontal line scanning time divided by a first predetermined integral number, and wherein the determined integral number is determined based on a required effective exposure time to be regulated, and
      ii) adding the determined product to a second predetermined integral number to generate the reference horizontal clock number, wherein the second predetermined integral number is larger than a number of reference horizontal clocks in a horizontal blanking time; and
   b) generating the transfer gate pulse signal at an instant after the lapse of a required effective exposure time defined by the reference horizontal clock number times the time for a reference horizontal clock, from a predetermined reference instant.

2. The method of claim 1 wherein the predetermined reference instant is a time of the rising edge of a horizontal synchronization pulse.

3. The method of claim 1 wherein the determined integral number is calculated by a central processor unit as a value corresponding to an appropriate exposure time.

4. The method of claim 3 wherein the transfer gate pulse signal is generated by a timing generator coupled with the central processing unit, and wherein the determined integral number is a binary number.

5. The method of claim 1 wherein the determined integral number is a binary number defined by a number of bits between and including 3 and 12.

6. The method of claim 1 wherein the unit clock number is 268.

7. The method of claim 1 wherein the second predetermined number is 130.

8. The method of claim 1 wherein the first predetermined integral number is eight.

9. The method of claim 1 wherein the required effective exposure time ranges from slightly less than one horizontal line scanning time to approximately 1/16 of one horizontal line scanning time.

10. For use with a camera having an imaging device and a signal generator for generating horizontal synchronization signals and vertical synchronization signals for reading out information captured by the imaging device, an apparatus for controlling an exposure time by controlling a charge accumulation time of a photodiode of the imaging element in synchronism with a transfer gate pulse signal, the apparatus comprising:
   a) a central processing unit adapted to generate an integral number based on a required effective exposure time to be regulated; and
   b) a timing generator, the timing generator
      i) being coupled with the central processing unit for receiving the integral number,
      ii) being coupled with the imaging device for providing the transfer gate pulse signal to the imaging device, and
      iii) adapted to generate the transfer gate pulse signal by
         A) obtaining a reference horizontal clock number by
            1) determining a product of a unit clock number and the integral number generated by and provided from the central processing unit, wherein the unit clock number is the number of reference horizontal clocks in one horizontal line scanning time divided by a first predetermined integral number, and
            2) adding the determined product to a second predetermined integral number to generate the reference horizontal clock number, wherein the second predetermined integral number is larger than a number of reference horizontal clocks in a horizontal blanking time, and
         B) generating the transfer gate pulse signal at an instant after the lapse of a required effective exposure time defined by the reference horizontal clock number times the time for a reference horizontal clock, from a horizontal synchronization signal provided by the signal generator.

11. The apparatus of claim 10 wherein the determined integral number is a binary number.

12. The apparatus of claim 11 wherein the binary number is defined by a number of bits between and including 3 and 12.

13. The apparatus of claim 10 wherein the unit clock number is 268.

14. The apparatus of claim 10 wherein the second predetermined number is 130.

15. The apparatus of claim 10 wherein the first predetermined integral number is eight.

16. The apparatus of claim 10 wherein the required effective exposure time ranges from slightly less than one horizontal line scanning time to approximately 1/16 of one horizontal line scanning time.

* * * * *